United States Patent

Schulz et al.

[11] 4,350,398
[45] Sep. 21, 1982

[54] ROLLING BEARING HAVING SEPARATE FLANGE RING WITH SAWTOOTH-SHAPED FLANGE

[75] Inventors: Horst-Hermann Schulz, Trebel; Johannes Köneke, Wustrow, both of Fed. Rep. of Germany

[73] Assignee: SKF Kugellagerfabriken GmbH, Schweinfurt, Fed. Rep. of Germany

[21] Appl. No.: 144,355

[22] Filed: Apr. 28, 1980

Related U.S. Application Data

[63] Continuation of Ser. No. 954,670, Oct. 26, 1978, abandoned.

[30] Foreign Application Priority Data

Oct. 27, 1977 [DE] Fed. Rep. of Germany ... 7733083[U]

[51] Int. Cl.³ ............................................. F16C 33/58
[52] U.S. Cl. .................................... 308/216; 308/202; 308/DIG. 11
[58] Field of Search .................... 308/196, 207 R, 212, 308/213, 214, 216, 217, 236, DIG. 11, 202

[56] References Cited

U.S. PATENT DOCUMENTS 1,231,752  7/1917  Laycock ............................ 308/212
2,856,247 10/1958  Anderson ......................... 308/212
3,975,066  8/1976  Hofmann et al. ............... 308/217 X Primary Examiner—Frederick R. Schmidt
Attorney, Agent, or Firm—Daniel M. Rosen

[57] ABSTRACT

In a rolling bearing having a separate flange ring on one side of a bearing ring, the flange ring has an annular flange with a sawtooth-shaped cross section that engages a similar shaped annular groove in the bearing ring.

17 Claims, 4 Drawing Figures

ROLLING BEARING HAVING SEPARATE FLANGE RING WITH SAWTOOTH-SHAPED FLANGE

This is a continuation of application Ser. No. 954,670, filed Oct. 26, 1978 now abandoned.

BACKGROUND OF THE INVENTION

This invention relates to a rolling bearing of the type having a separate flange ring arranged on one facing side of the bearing ring, the flange ring having a shoulder or flange which extends generally axially, partway in or over the bearing ring to engage an annular shoulder of the bearing ring.

Rolling bearings of this type are generally known. In one tapered rolling bearing of this type, having a separate flange ring on the outer ring, the flange ring is provided with an axially directed shoulder which extends partway into the outer race ring. This flange ring is either loosely inserted, i.e., not affixed to the outer ring, or it can be welded or adhesively connected to the outer ring. The arrangement of the prior art, wherein the flange ring is not affixed to the outer ring has the disadvantage that during transport and during installation thereof, an integral unit is not provided, so that the individual parts of the bearing can separate. If the flange ring is connected to the bearing ring by welding, the danger then exists that, due to the heat of the welding, changes may occur in the bearing material in the region of the weld which may impair the useful life of the bearing. Further, it has been shown that when the flange ring is affixed to the bearing ring by means of adhesives or the like, problems still arise, and it takes a long time to provide an effective connection. In addition, welding as well as the use of adhesives to hold the parts together are very uneconomical as a result of the time and effort involved.

The present invention is therefor directed to the provision of a bearing of the above type, in which a satisfactory, simple and practical mounting of the separate flange ring is insured.

SUMMARY OF THE INVENTION

This objective is achieved according to the present invention, by providing a sawtooth-shaped annular flange, (i.e. having a sawtooth-shaped cross section) on the essentially axially directed annular flange of the flange ring, the flange beig shaped to engage a corresponding formed annular groove of the bearing ring. In order to simplify the axial forcing of the shouldered ring into position, it is expedient to form the sawtooth-shaped annular flange with a bevelled side surface on the side thereof facing the bearing ring. Further, in order to avoid scraping of the material of the bearing with the pointed end of the sawtooth-shaped annular flange in the assembly of the bearing, in accordance with a further feature of the invention the tip of the sawtooth-shaped flange is formed to be smooth, for example to be in the form of a cylindrical surface.

BRIEF FIGURE DESCRIPTION

In order that the invention will be more clearly understood, it will now be disclosed in greater detail with reference to the accompanying drawing, wherein.

DETAILED FIGURE DESCRIPTION

Figure 2:
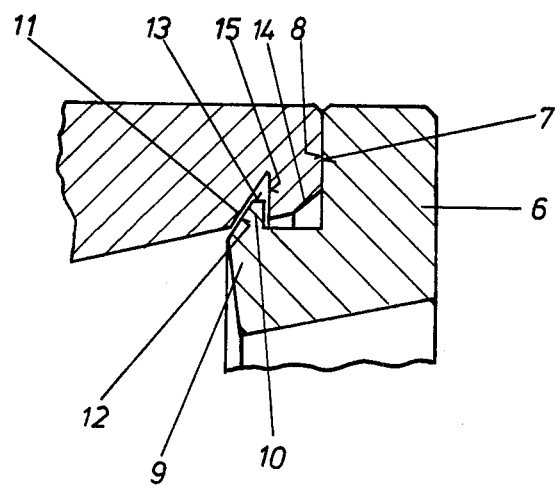
FIG. 2 is an enlarged cross sectional view of a portion of the bearing of FIG. 1, in the region designated as A thereof.
Figure 1:
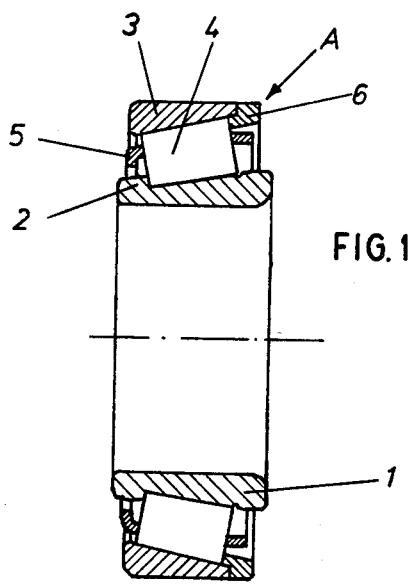
FIG. 1 is a cross sectional view of a tapered roller bearing having a loose flange ring on the outer ring.
Figure 3:
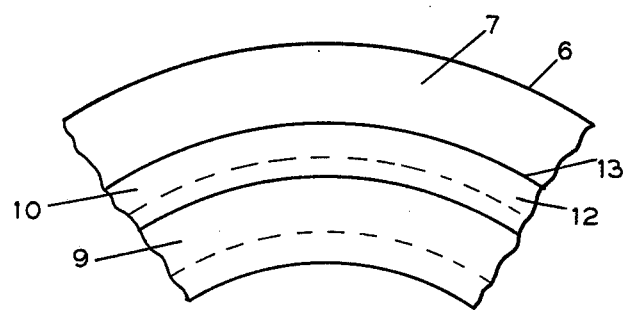
FIG. 3 is an enlarged end view of the portion of the separate flange ring illustrated in FIG. 2, this view being taken from the side of the flange ring that faces the bearing ring in use.

Referring now to FIGS. 1, 2 and 3 therein is illustrated a tapered roller bearing A comprising an inner ring 1 with an internal flange 2 on the smaller diameter end of the inner race ring. The bearing further has an outer race ring 3, and a plurality of tapered rollers are arranged between the two bearing rings. The tapered rollers are guided by a cage 5, and a flange ring 6 is affixed to the larger diameter end of the race of the outer ring. This flange ring, which has a facing surface 7 engaging the corresponding facing surface 8 of the outer ring, has an essentially axially directed annular shoulder 9 extending partway into the bearing outer ring 3. The annular shoulder 9 has a sawtooth-shaped annular flange 10 on its surface. The term "sawtooth-shaped", as employed herein, refers to the formation of the cross section of the flange generally in the shape of the tooth of a saw, in longitudinal planes of the bearing, as opposed to the circumferential direction. The sawtooth-shaped annular flange 10 meshes in a corresponding sawtooth-shaped annular groove 11 in the race of the outer bearing ring 2. The sawtooth-shaped annular flange 10 has a bevelled side surface 12 on the side thereof facing inwardly with respect to the bearing. In the region of the tip of the sawtooth-shape, the flange has a cylindrical surface 13 (i.e., the tip of the sawtooth is not pointed). In addition, the inner edge of the end surface 8 of the outer ring 3 is bevelled as shown at 14, so that, upon axially pressing of the flange ring in the bearing outer ring 3 during assembly of the structure, the annular flange 10 is elastically deformed, so that it can snap into the annular groove 11. After the snapping of the flange in place, the annular flange expands in the radial direction so that it grips behind the generally radially directed side surface 15 of the annular groove 11, thereby fastening the flange ring 6 to the bearing outer ring 3.

The term "sawtooth" as employed herein, refers generally to a cross sectional shape having at least one inclined radially extending surface. The opposed surface, in the axial direction, may be, and is preferably directly radially extending, in order to maintain a better grip in the annular groove of the bearing ring. While there two surfaces may join at a point, the term is considered to be inclusive of shapes wherein a transition is provided between the two surfaces in order to avoid a sharp point. Thus, in the above example, such a transition is in the form of a cylindrical surface. It is of course not necessary that such a cylindrical surface be provided in the matching groove of the bearing ring.

Figure 4:
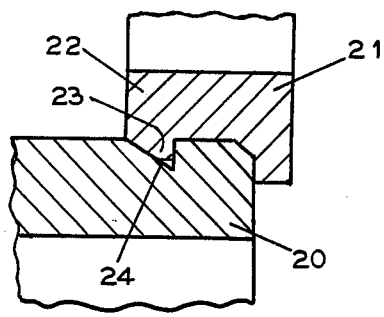
FIG. 4 is an enlarged cross sectional view of a portion of a bearing in accordance with a further embodiment of the invention.

The invention is of course applicable to structures wherein a loose or separate flange ring is to be provided on an inner bearing ring. Thus, as illustrated in FIG. 4, an inner bearing race ring 20 of a bearing is provided with an end annular flange ring 21. The flange ring 21 has an axially inward directed shoulder 22, and the shoulder 22 has, on the end thereof facing inwardly of the bearing, a radially inward directed annular flange 23 with a sawtooth-shaped cross section, as above discussed. In this arrangement, the outer surface of the inner bearing ring has an annular groove 24 shaped to receive the flange 23.

The above-described embodiment of the invention has the advantage that a secure fastening of the flange ring to the bearing ring is assured, in a simple manner. The assembly of the parts is thereby obtained without great difficulty.

In the present disclosure, the reference to a "loose" flange ring refers to the fact that the flange ring 6 is separate from the outer ring, and does not necessarily infer that, in use of the bearing, any extent of play is provided. While the flange ring has been illustrated as being of a metallic material, it is of course evident that a plastic material may be provided for this element.

It is further to be understood that the present invention is not limited to the sole embodiment thereof as described. In addition to the arrangement of the loose flange ring on the end of the tapered roller bearing, it is also possible to employ the arrangement in accordance with the invention on other types of bearings, for example, on cylindrical roller bearings or the like. It is therefore intended in the following claims to cover each such variation and modification that falls within the true spirit and scope of the invention.

What is claimed is:

1. In a rolling bearing having a race ring with an at least partially axially directed race, and a separate flange ring connected to said race ring and having an axially directed annular shoulder extending into or over and engaging said race ring for retaining rolling elements in said bearings; the improvement wherein said flange ring is a continuous ring, said shoulder has a radially directed flange with a preformed sawtooth-shaped cross section with an inclined edge surface converging axially inwardly of said bearing, said race ring has an annular groove with a sawtooth-shaped cross section with a correspondingly inclined surface and positioned to receive said radially directed flange, said race ring having a radially extending end face, and said flange ring having a radially extending surface axially abutting said end face substantially throughout the radial extent of said end face.

2. The rolling bearing of claim 1 wherein said race ring is an inner race ring.

3. In rolling bearing of claim 1 wherein said race ring is an outer race ring.

4. The rolling bearing of claim 1 wherein said radially directed flange has a tapered side facing said race ring.

5. The rolling bearing of claim 4 wherein said flange has a directly radially extending surface on the side thereof away from said race ring.

6. The rolling bearing of claim 1 wherein the tip of said flange away from said shoulder has a cylindrical surface.

7. The rolling bearing of claim 1 wherein the face of said race ring toward said flange ring has a bevelled edge.

8. The rolling bearing of claim 1 wherein said bearing has a rotatable cage mounted to separate said rolling elements.

9. The rolling bearing of claim 1 wherein said inclined surface of said race ring intersects said race.

10. The rolling bearing of claim 1 wherein the surface of said race is inclined to the axis of said rolling bearing.

11. The rolling bearing of claim 1 wherein said radially directed surface is axially spaced from said radially directed flange, the surface of said flange ring between said radially directed flange and radially directed surface being substantially parallel to said race.

12. The rolling bearing of claim 11 wherein said inclined edge surface of said race ring intersects said race.

13. The rolling bearing of claim 1 wherein said inclined edge surface of said flange ring extends at a substantial angle to the surface of said race.

14. The rolling bearing of claim 1 further comprising a cage positioned to separate said rolling elements, said cage being freely rotatable with respect to said race ring.

15. In a rolling bearing having a race ring with an at least partially directed race, a plurality of rolling elements mounted to radially engage said race, a separate flange ring having one axial end adapted to abut and axially retain said rolling elements, said flange ring radially engaging said race, and a separate cage element for spacing said rolling elements from one another; the improvement wherein said race ring has a radially directed end face on one end thereof, and an annular groove in said race between said rolling elements and said end face, said groove having a first side away from said end face that is inclined to converge inwardly away from said one end face, and a second side toward said end face that is radially directed and axially spaced from said end face, said flange ring being circumferentially continuous and having an annular ridge received in said groove, said ridge having inclined and radially extending surfaces engaging said first and second sides of said groove respectively, said flange ring further having a radially extending surface axially abutting said end face substantially throughout its extent, and a radially extending end space from said end face to form an axial end of said bearing.

16. The rolling bearing of claim 15 further comprising a beveled surface between said race and said end face.

17. The rolling bearing of claim 15 wherein said race ring is an outer bearing ring and has an outer axially extending surface, said flange ring extending to have the same outer diameter as said race ring on the end thereof abutting said end face.

* * * * *

UNITED STATES PATENT AND TRADEMARK OFFICE
CERTIFICATE OF CORRECTION

PATENT NO. : 4,350,398
DATED : September 21, 1982
INVENTOR(S) : Horst Hermann Schulz & Johannes Koheke It is certified that error appears in the above—identified patent and that said Letters Patent is hereby corrected as shown below:

Col. 2, line 55, delete "there" and insert -- these --.

Signed and Sealed this

Twenty-second Day of November 1983

[SEAL]

Attest:

GERALD J. MOSSINGHOFF

Attesting Officer

Commissioner of Patents and Trademarks